(12) United States Patent
Mochizuki

(10) Patent No.: US 11,747,974 B2
(45) Date of Patent: Sep. 5, 2023

(54) ORIENTATION CALCULATION PROGRAM AND DEVICE, AND PROGRAM AND DEVICE USING ORIENTATION INFORMATION

(71) Applicant: Leona Mochizuki, Shizuoka (JP)

(72) Inventor: Leona Mochizuki, Shizuoka (JP)

(*) Notice: Subject to any disclaimer, the term of this patent is extended or adjusted under 35 U.S.C. 154(b) by 0 days.

(21) Appl. No.: 17/385,495

(22) Filed: Jul. 26, 2021

(65) Prior Publication Data

US 2021/0349595 A1 Nov. 11, 2021

Related U.S. Application Data

(63) Continuation of application No. 16/496,805, filed as application No. PCT/JP2018/011948 on Mar. 24, 2018, now abandoned.

(30) Foreign Application Priority Data

Mar. 24, 2017 (JP) .................................. 2017-060230
Apr. 3, 2017 (JP) .................................. 2017-074081

(51) Int. Cl.
G06F 3/0346 (2013.01)
G06F 3/0488 (2022.01)

(52) U.S. Cl.
CPC .......... *G06F 3/0488* (2013.01); *G06F 3/0346* (2013.01)

(58) Field of Classification Search
CPC ...... G06F 3/0484; G06F 3/04845; G06F 3/01; G06F 3/016; G06F 3/0346;
(Continued)

(56) References Cited

U.S. PATENT DOCUMENTS

2007/0270219 A1 11/2007 Sugioka et al.
2008/0015031 A1 1/2008 Koizumi et al.
(Continued)

FOREIGN PATENT DOCUMENTS

JP H06-190144 A 7/1994
JP 2007-296219 A 11/2007
(Continued)

OTHER PUBLICATIONS

International Search Report dated Jul. 31, 2018 filed in PCT/JP2018/011948.
(Continued)

*Primary Examiner* — Temesghen Ghebretinsae
*Assistant Examiner* — Ivelisse Martinez Quiles
(74) *Attorney, Agent, or Firm* — Rankin, Hill & Clark LLP

(57) ABSTRACT

A non-transitory computer-readable medium stores a program that makes it easy to operate a numerical value input and a character in a virtual space by changing an orientation of a device. By setting a rotation axis of a device, the program calculates an arbitrary numerical value input from inclination of the device. Moreover, by making it possible to perform a moving operation for a character in a virtual space by using a numerical value according to the inclination, mainly in a device that includes a touch panel, the program provides a user with an operation of a character with a higher degree of freedom in particular in a first-person perspective or a third-person perspective.

2 Claims, 8 Drawing Sheets

(a) FRONT SURFACE (b) RIGHT SIDE SURFACE

(58) Field of Classification Search
CPC ............ G06F 2200/1637; G06F 3/011; G06F 3/04847; G06F 3/048–0488
See application file for complete search history.

(56) References Cited

U.S. PATENT DOCUMENTS

| | | |
|---|---|---|
| 2010/0286940 A1 | 11/2010 | Dohta |
| 2011/0285623 A1 | 11/2011 | Ye et al. |
| 2012/0004017 A1* | 1/2012 | Sakurai .............. A63F 13/5258 463/2 |
| 2012/0026166 A1 | 2/2012 | Takeda et al. |
| 2013/0031515 A1 | 1/2013 | Funabashi et al. |
| 2013/0038532 A1 | 2/2013 | Okura et al. |
| 2013/0217498 A1* | 8/2013 | Wang ...................... A63F 13/42 463/37 |
| 2013/0249819 A1 | 9/2013 | Akifusa et al. |
| 2014/0012409 A1 | 1/2014 | McMurtry et al. |
| 2014/0371954 A1* | 12/2014 | Lee ........................ G08C 17/02 701/2 |
| 2015/0193003 A1 | 7/2015 | Yamada |
| 2015/0363915 A1* | 12/2015 | Li ......................... G06F 3/0346 345/649 |
| 2016/0059120 A1* | 3/2016 | Komorous-King ... A63F 13/211 463/36 |
| 2018/0104573 A1 | 4/2018 | Jeffery et al. |

FOREIGN PATENT DOCUMENTS

| | | |
|---|---|---|
| JP | 2011-237838 A | 11/2011 |
| JP | 2011-247866 A | 12/2011 |
| JP | 2012-168931 A | 9/2012 |
| JP | 2014-512530 A | 5/2014 |
| JP | 2015-225397 A | 12/2015 |
| JP | 2016-076104 A | 5/2016 |

OTHER PUBLICATIONS

Furukawa, iPhone/iPad programming bible, 1st edition, SOCYM Co., Ltd., 2014, pp. 316-325.

\* cited by examiner (a) FRONT SURFACE　　　(b) RIGHT SIDE SURFACE (b) RIGHT SIDE SURFACE (a) FRONT SURFACE　　　(b) RIGHT SIDE SURFACE (a) MOVEMENT TO FRONT OR BACK (b) MOVEMENT TO RIGHT OR LEFT (a) FRONT SURFACE (b) RIGHT SIDE SURFACE

ORIENTATION CALCULATION PROGRAM AND DEVICE, AND PROGRAM AND DEVICE USING ORIENTATION INFORMATION

TECHNICAL FIELD

It is related to control of a character in a first-person perspective and a third-person perspective.

BACKGROUND ART

In devices having a touch panel, such as a smartphone, a tablet, and the like, an input by a touch is a main input means.

In the case of inputting with a single hand, in a general holding way as shown in FIG. 1, an input will be made with one thumb (2).

In the case of that a device is held by one hand and an input is made with the other hand (3), up to 6 inputs are made with the thumb (2) of the holding hand (1) and the five fingers of the other hand (3).

In the holding way used mainly in a game operation in which, as shown in FIG. 2, a device is held by both hands and a touch input is made with the two thumbs (11 and 12), two inputs are made with the thumbs (11 and 12) of both hands.

In the field of games, virtual buttons and analog sticks are provided within a screen and they are operated with touch inputs by previously mentioned ways, whereby it becomes possible to operate elements such as a character and a menu in a game (for example, Patent Literature 1 and Patent Literature 2).

In a way of holding shown in FIG. 2 mainly used in a game operation, in the case of including actions, such as a movement, a camera operation, an attack, and a jump, like a first-person perspective game and a third-person perspective game, there is a method in which two game operations such as movement with a virtual joystick and actions such as an attack and a jump with a virtual button are operable with touch inputs within a screen, and operations on perspectives are linked with the orientation of a device.

CITATION LIST

Patent Literature

Patent Literature 1: JP 2015-225397 A
Patent Literature 2: JP 2012-168931 A

SUMMARY OF INVENTION

Technical Problem

In the case of a touch input with how to hold shown in FIG. 1 and having been used in Patent Literature 1, only one input can be handled simultaneously. Although it becomes possible to handle six inputs by adding inputs with five fingers of the hand not holding the device, since the hand not holding the device covers a screen, a screen becomes hard to be viewed, and the operation becomes difficult.

In a touch input by how to hold shown in FIG. 2 and having been used in Patent Literature 2, only two inputs are handled simultaneously, for example, like a first-person perspective game or a third-person perspective game, when it is necessary to individually operate actions such as a movement, a camera (perspective) operation, an attack, and a jump, it cannot be operated satisfactorily with existing methods that handle only two inputs simultaneously. When an operation is performed adding the index finger, a device becomes hard to be hold, and the operation becomes difficult at the time.

In order to solve the above-described problems, in the case of that a camera operation is performed with a method of interlocking with the orientation of a device, an operator needs to change an orientation of a body for a camera operation, and the change makes other operations difficult.

Moreover, a numerical input based on the orientation of a device is difficult to perform elaborate operations by a user, because the numerical input is hypersensitive to a slight change of the orientation.

Therefore, an object of the present invention is to provide a program that makes a numerical input based on an orientation of a device easy for a user and includes an operating means that easily operates a movement, an aiming, and an action especially in a first-person perspective or a third-person perspective mainly in a device including a touch panel.

Solution to Problem

An orientation calculation program that calculates a rotation amount from a reference orientation of a device, sets an arbitrary coordinate system based on a rotation axes that references an orientation of the device as rotation axes of the device, determines a vector based on the reference orientation, and calculates the rotation amount of the device from the reference orientation to a current orientation according to components of the vector in the current coordinate system.

An orientation calculation program that calculates a rotation amount from a reference orientation of a device, sets an arbitrary coordinate system based on rotation axes references an orientation of the device as rotation axes of the device, and uses a value obtained by multiplying a rotation amount on the rotation axis on the reference orientation or a rotation amount on the rotation axis on a current orientation with an arbitrary constant.

The rotation amount on the rotation axis is a component of rotation on the rotation axis that is obtained by expressing the reference orientation and a current orientation of the device with Euler angle or quaternion and by calculating a difference between the reference orientation and the current orientation.

An orientation calculation program that calculates a rotation amount from a reference orientation of a device, sets an arbitrary coordinate system based on rotation axes references an orientation of a device as rotation axes of the device, sets an arbitrary plane corresponding to a reference orientation of the device, and determines a value according to an angle formed between the plane and the rotation axis the rotation amount of the device.

A range is set to invalidate the rotation amount and determine the rotation amount a predetermined value, or ignore the rotation amount.

The predetermined value is, for example, zero or a rotation amount in a case of that the orientation of the device matches the reference orientation.

The phrase "ignore the rotation amount" means, for example, that an arbitrary function that uses the rotation amount determines that an input from the orientation calculation program is not performed.

A correction according to the range is applied to the rotation amount in the outside of the range.

In the state of coming out of the range, the rotation amount becomes the minimum, and then the rotation amount is changed from there according to the orientation of the device.

In a case of that the coordinate system of the device is

Cartesian coordinate system in which a Dx axis is a rightward direction of the device, a Dy axis is an upward direction of the device, and a Dz axis is a thickness direction of the device, the coordinate system based on the rotation axes is to match one in which the coordinate system of the device is rotated by an arbitrary amount on the Dx axis.

In a case of that the coordinate system of the device is

Cartesian coordinate system in which a Dx axis is a rightward direction of the device, a Dy axis is an upward direction of the device, and a Dz axis is a thickness direction of the device, the coordinate system based on the rotation axes is Cartesian coordinate system in which one of the rotation axes is to match the Dx axis, and another rotation axis is to match an outer product of the Dx axis and gravity on the reference orientation.

In a case of that the coordinate system of the device is

Cartesian coordinate system in which a Dx axis is a rightward direction of the device, a Dy axis is an upward direction of the device, and a Dz axis is a thickness direction of the device, the coordinate system based on the rotation axes is Cartesian coordinate system in which one of the rotation axes is to match a direction opposite to gravity, and another rotation axis is to match an outer product of the Dx axis and gravity on the reference orientation.

An operation program that causes a character in a virtual space to move, determines a moving direction and a moving speed of the character according to a rotation amount based on an orientation calculation program.

The moving direction of the character is based on the observing direction of the observing means of the character.

A means for detecting a touch input is included, and a change of the observing direction of the observing means that observes a character, is made according to a touch input.

Operation of an aim that shows an action point at the time of performing a certain action is performed according to a touch input.

It is made possible to further perform operation excepting change of the movement and the observing direction, and the operation of an aim.

It is made possible to output the rotation amount or a numerical value according to the rotation amount as a signal available in an arbitrary program.

An operation program that causes an arbitrary moving object to move, determines a moving direction and moving speed of the moving object according to a change of an orientation from a reference orientation of a device.

The moving direction of the moving object references the observing direction of the observing means of the moving object.

A means detects a touch input is included, and a change of the observing direction of the observing means of the moving object is made according to a touch input.

It is made possible to further perform operations excepting change of the movement and the observing direction.

Advantageous Effects of Invention

A user inclines a device, whereby it is easy to perform a numerical input. The moving direction of a character is determined according to the inclination of the device and the moving operation is easy. In addition, examples of other actions and functions include a perspective camera and an aiming, an attack, a jump can be operated independently and simultaneously.

DESCRIPTION OF EMBODIMENTS

As an example of description, according to the present invention, is an embodiment of a program of a third-person character game in a tablet device (60) that includes an inclination calculating means and a touch display.

Figure 4:
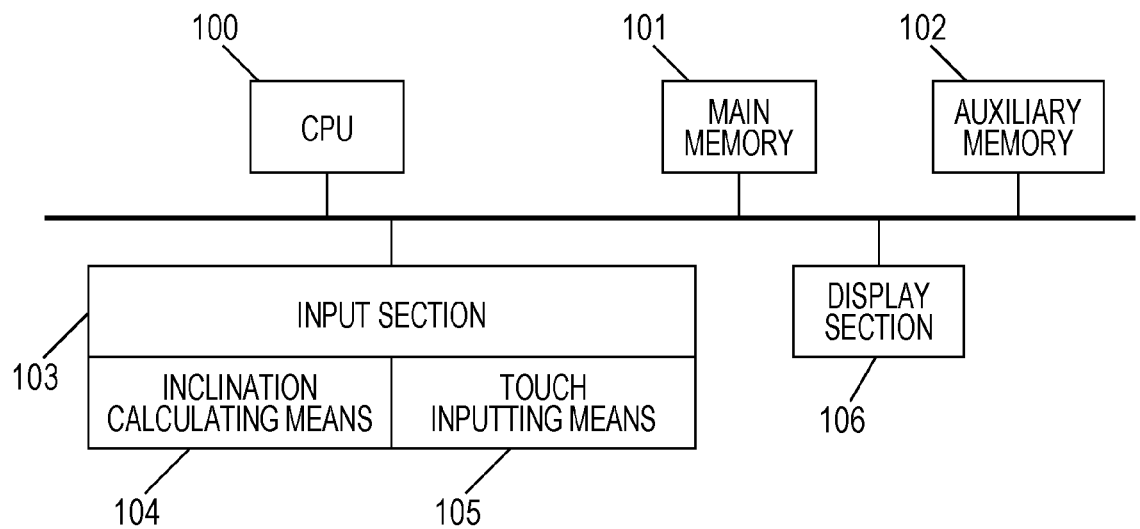
FIG. 4 is a block diagram showing a hardware configuration of a tablet device.

FIG. 4 is a block diagram showing a hardware configuration example of the tablet device (60). The tablet device (60) in the present embodiment is a general computer that is equipped with a CPU (100), a main memory (101), an auxiliary memory (102), a display section (106), and an input section (103). Among these, in the auxiliary memory (102), a program according to the present embodiment is stored. The display section (106) includes a touch display. The input section (103) includes a touch inputting means (105) of the touch display and an inclination calculating means (104). By the touch inputting means (105), the program executed by the tablet device (60) can detect an existence of some operation on the touch display. By the inclination calculating means (104), the program executed by the tablet device (60) can detect the inclination of the tablet device (60). Here, the touch inputting means (105) and the inclination calculating means (104) are realized by hardware, software, or a combination of them. The inclination of the device can be calculated sequentially.

The inclination calculating means (104) is provided in the case of that an orientation calculation program is used. The touch inputting means is provided in the case of that a touch input is used. In the case of displaying a moving image, a display is provided as the display section (106).

For example, in an embodiment in which the displaying of a moving image is not performed, the above-described computer may not include a display. Also, the same applies to the touch inputting means.

An example of the embodiment excepting the above-described tablet device is, for example, an input device equipped with the inclination calculating means. For example, it is a controller or the like of a game equipped with the inclination calculating means. In such a case, so as to adapt to an embodiment, the inclination calculating means (104) and the other optional configuration components may be separated, and configuration components unnecessary in the embodiment may not be included. The above is merely an example, and the configuration is appropriately set so as to adapt to an embodiment.

A numerical value corresponding to the rotation amount from the reference orientation of a device (60) is determined. Although a determining method of the rotation amount of a device is exemplified below, as to how to determine a rotation amount according to a change of the orientation of a device, a designer may design it arbitrarily considering user's play style.

Figure 7:
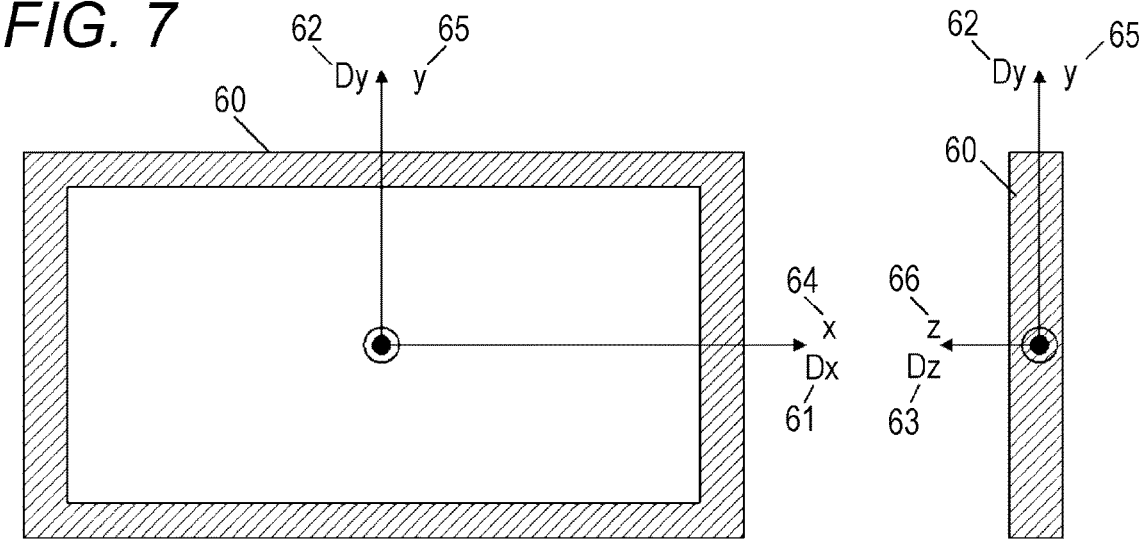
FIG. 7 illustrates example 1 of how to take a rotation axis.

The coordinate system of the device (60) is defined for description. As shown in FIG. 7, the coordinate system is Cartesian coordinate system in which a Dx axis (61) is the rightward direction of the device (60), a Dy axis (62) is the upward direction of the device (60), and a Dz axis (63) is the thickness direction of the device (60).

At this time, the rightward direction and upward direction of the device (60) may follow the holding direction of the device (60), such as holding with a longitudinal orientation and holding with a lateral orientation. In the case of that there is provided a display as a display section, they may be caused to follow the drawing direction of the display. That is, on the basis of the contents of drawing, the upward direction may be a Dx (61) axis, the rightward direction may be a Dy (62), and the direction in which a screen faces, may be a Dz (63) axis.

The rotation axis of a device is considered on the basis of vectors in the coordinate system of Dx (61), Dy (62), and Dz (63) of the above-described device (60). As arbitrary vectors that represent the rotation axes of a device, an x axis (64), a y axis (65), and a z axis (66) are defined. The x axis (64), the y axis (65), and the z axis (66) share the same starting point of the vector, and it is assumed that they are handled also as a coordinate system.

In one example of how to take the rotation axis, the x axis (64), the y axis (65), and the z axis (66) are to match the Dx axis (61), the Dy axis (62), and the Dz axis (63), respectively.

Figure 8:
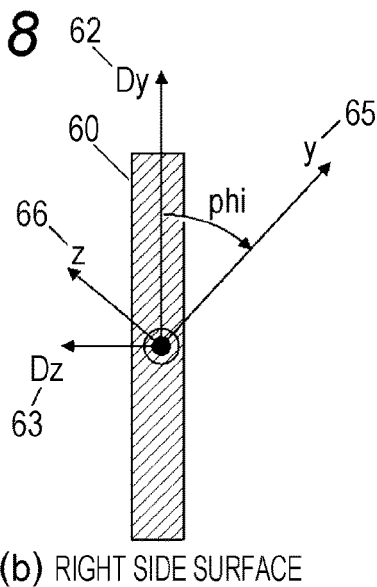
FIG. 8 illustrates example 2 of how to take a rotation axis.

As shown in FIG. 8, in another example of how to take the rotation axis, the x axis (64), the y axis (65), and the z axis (66) shown in FIG. 7 are rotated by $\varphi$ (phi) around the Dx axis (61) as a rotation axis. That is, the Dx (61) axis, the Dy axis (62), and the Dz axis (63) are rotated by $\varphi$ (phi) around the Dx axis (61) as a rotation axis.

When the device (60) is rotated, even in the same rotation, the rotation amount around each of x, y and z axes differs depending on the value of phi.

Here, when the y axis (65) is used as the rotation axis, a tendency of change in the rotation amount around the y axis (65) corresponding to a tendency of rotation of the device (60), changes depending on the value of phi.

For example, when phi=0°, the rotation amount in the y axis (65) is determined according to rotation in the direction of the Dy axis (62). As an example of operation, in a case of that the z axis (66) is to match the direction opposite to the direction of gravity, the rotation amount in the y axis (65) changes by inclining the device (60) from the horizontal state to left or right.

When phi=90°, the y axis (65) will match the Dz axis (63), and the rotation amount in the y axis (65) is determined according to rotation in the direction of the Dz axis (63). As an example of operation, in a case of that the z axis (66) is to match the direction opposite to the direction of gravity, the rotation amount in the y axis (65) changes by inclining the device from the standing state to left or right.

Similarly, the Dy (62) axis and the Dz axis (63) may be rotated.

Another determining method of the rotation axis is to match the x axis (64) with the Dx axis (61), and to make the y axis (65) an outer product of the Dx axis (61) and gravity in the reference orientation. Thus, the y axis (65) in the reference orientation is perpendicular to gravity.

Figure 9:
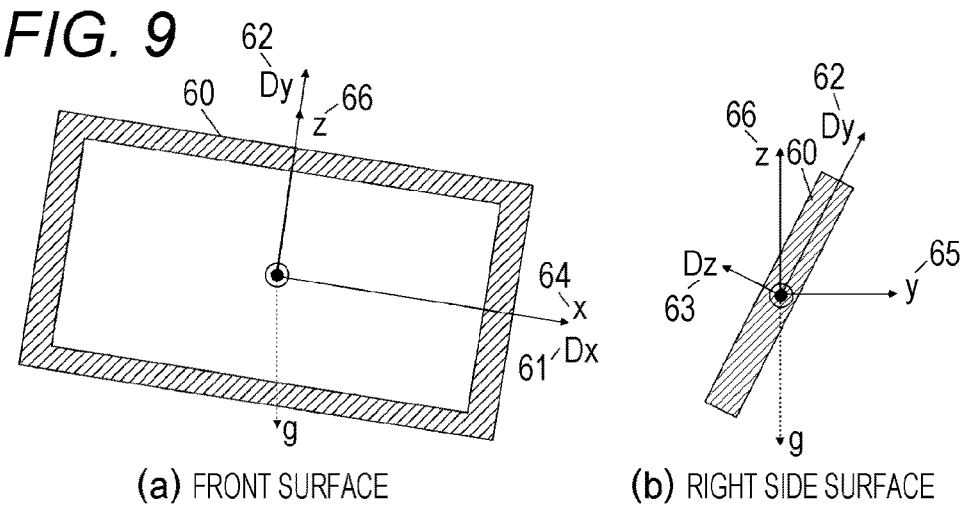
FIG. 9 illustrates example 3 of how to take a rotation axis.

FIG. 9 shows an example. A symbol "g" represents gravity.

In still another determining method of the rotation axis, the z axis (66) is to match direction opposite to the direction of gravity, and the y axis (65) is an outer product of the Dx axis (61) and gravity in the reference orientation.

Figure 11:
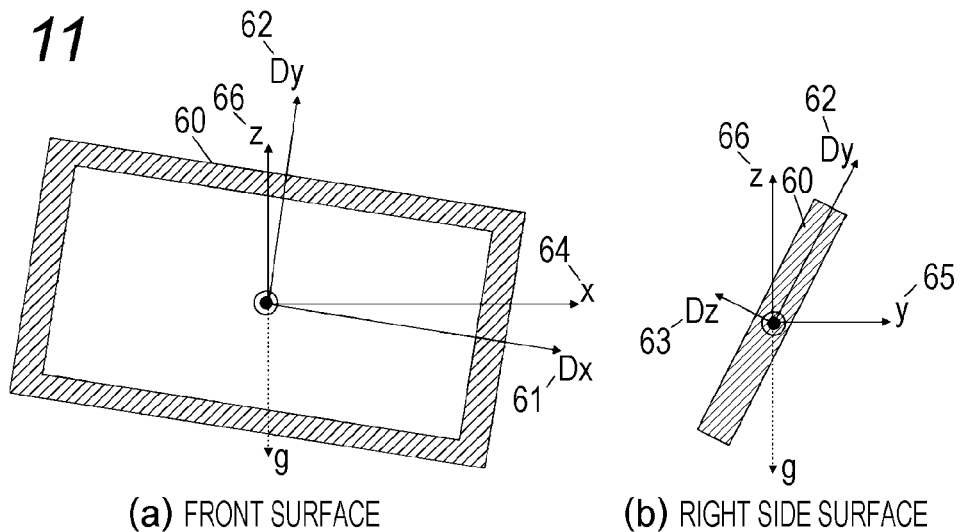
FIG. 11 illustrates Example 4 of how to take a rotation axis.

An example is shown in FIG. 11. A symbol "g" represents gravity.

In the reference orientation of the device (60), the x axis (64), the y axis (65), and the z axis (66) are an x0 axis (67), a y0 axis (68), and a z0 axis (69), respectively.

The origin of a coordinate system that includes the x0 axis (67), the y0 axis (68), and the z0 axis (69) is to match the origin of the coordinate system that includes the x axis (64), the y axis (65), and the z axis (66), not depending on a change of the position of the device (60). Moreover, by change of the orientation of the device, the direction of each of the x0 axis (67), the y0 axis (68), and the z0 axis (69) does not change, and the x0 axis (67), the y0 axis (68), and the z0 axis (69) represent the reference orientation of the device (60). The origin becomes a center of rotation of the device (60).

According to a user's orientation, i.e., the reference orientation of the device (60), a rotation axis of the x axis (64), the y axis (65), the z axis (66) and phi are enabled to be set.

Alternatively, a user is enabled to set freely.

How to determine a rotation amount is described. A plurality of determining methods of a rotation amount are considered, and their examples are shown below.

A first determining method of a rotation amount is described.

The rotation amount of each of the x axis (64), the y axis (65), and the z axis (66) means how much the device (60) has rotated around each of the x axis (64), the y axis (65), and the z axis (66) from the reference orientation of the device (60).

A second determining method of a rotation amount is described.

The rotation amount of each of the x axis (64), the y axis (65), and the z axis (66) means how much the device (60) has rotated around each of the x0 axis (67), the y0 axis (68), and the z0 axis (69) from the reference orientation of the device (60).

According to the first and second determining methods of the rotation amount, by quaternion or a Euler angle, the orientation and reference orientation of the device (60) may be expressed, and then, the rotation amount of each axis from the reference orientation may be calculated from a difference between the orientation of the device (60) and the reference orientation. In an example of calculation, according to quaternion expressed with a coordinate system that includes the x axis (64), the y axis (65), and the z axis (66), or a coordinate system that includes the x0 axis (67), the y0 axis (68), and the z0 axis (69), the quaternion in which the present orientation of the device (60) is multiplied with the inverse value of the reference orientation, becomes a difference between the present orientation and the reference orientation. Then, the difference is converted into the Euler-angle expression, and each component of a Euler angle is treated as a rotation amount.

A third determining method of a rotation amount is described.

Figure 5:
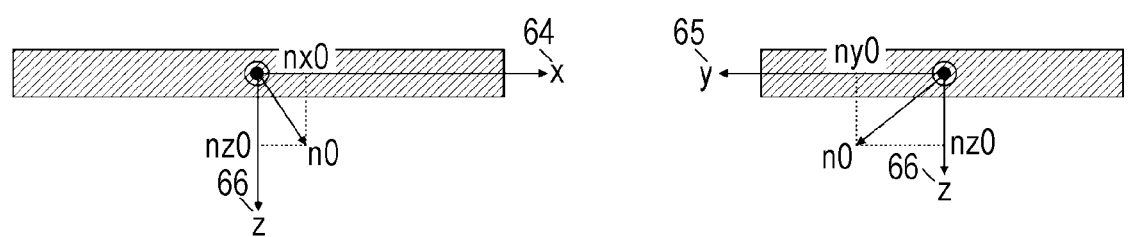
FIG. 5 is an explanatory diagram of a determining method of a rotation amount.

Consideration is given to a unit vector in the direction of the z0 axis (69) that is the z axis (66) at the time of the reference orientation of a device (60) that makes the origin of the coordinate system that includes the x axis (64), the y axis (65), and the z axis (66), a starting point. The rotation amount of each of the x axis (64) and the y axis (65) is determined according to the y axis component and the x axis component of an above-described unit vector. An example is shown in FIG. 5.

In a specific example, when an above-described unit vector is represented as (nx0, ny0, nz0) in the coordinate system that includes the x axis (64), the y axis (65), and the z axis (66), the rotation of the x axis (64) may be arctan (ny0/nz0), and the rotation of the y axis (65) may be arctan (nx0/nz0). The symbol "arctan" is an inverse trigonometric function. Instead, arctan may be arctan 2 (ny0, nz0) and arctan 2 (nx0, nz0).

Naturally, a value obtained by multiplying the value of each of ny0 and nx0 with any constant may be treated as a rotation amount of each of the x axis (64) and the y axis (65), and other calculation formulas may be used.

In the case of that the orientation of the device is changed, relative to the z0 axis (69) that does not change depending on rotation of the device (60), the coordinate system that includes the x axis (64), the y axis (65), and the z axis (66) will rotate with the rotation of the device (60), and thus, the unit vector seems to rotate considering the view from the coordinate system that includes the x axis (64), the y axis (65), and the z axis (66).

Here, in the case of that the rotation amount on the z axis (66) is used, rotation on the z0 axis (69) of the device (60) is used. Since the x axis (64) and the y axis (65) also rotate by the rotation on the z0 axis (69), in the rotation on the z0 axis (69), the value of each of nx0, ny0, and nz0 does not change.

Instead of the above-described x axis (64), y axis (65), and z axis (66), the coordinate system that includes the x0 axis (67), the y0 axis (68), and the z0 axis (69), may be used. In such a case, instead of the above-described (nx0, ny0, nz0), a component (nx, ny, nz) in the x0 axis (67), the y0 axis (68), and the z0 axis (69) of a unit vector to the direction of the z axis (66) is used.

Here, in the case of that the rotation amount of the z axis (66) is used, the rotation of the device (60) on the z axis (66) is used. Since the unit vector to the direction of the above-described z axis (66) does not change depending on the rotation on the z axis (66), the values of nx, ny, and nz do not change in the rotation on the z axis (66).

The fourth determining method of the rotation amount is described.

It is assumed to express the reference orientation of the device (60) on a certain plane A in a space where the device (60) exists.

The rotation amount on the x axis (64) is an angle formed by a plane A and the y axis (65). The rotation amount on the y axis (65) is an angle formed by a plane A and the x axis (64). At this time, an angle formed the plane A and each axis is a value of the positive/negative considering the rotation direction of the device.

The plane A is a plane formed by the x0 axis (67) and the y0 axis (68) on the reference orientation of the device (60).

For example, when the rotation axis is taken as shown in FIG. 7, it is assumed that the plane A is parallel to the ground of the real world, the rotation amount of the device (60) according to the inclination relative to the ground will be calculated.

The numerical value based on the rotation amount of each axis is determined. From the rotation amount of each axis acquired from the orientation of the device, the numerical value for determining the moving direction and speed of a character is determined.

The numerical value input of each axis based on rotation is determined as follows.

Figure 3:
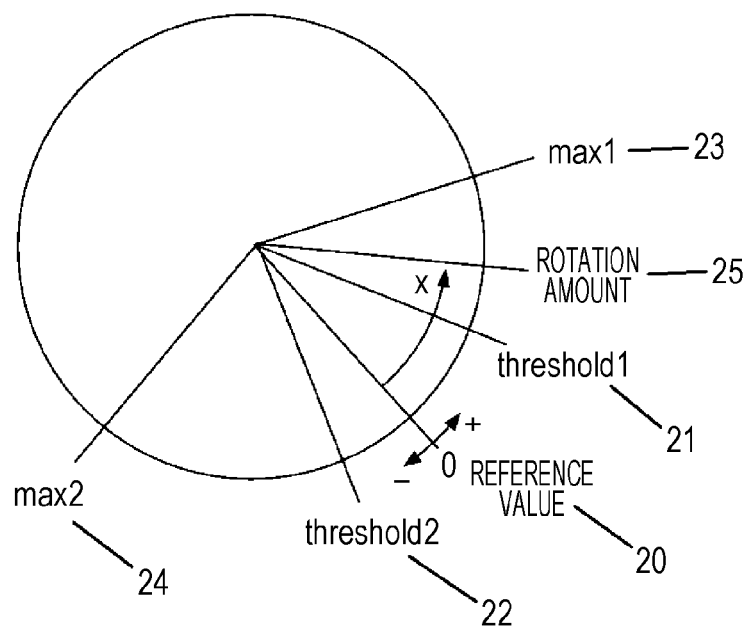
FIG. 3 is an explanatory diagram of a determining method of a numerical value input based on orientation information.

As shown in FIG. 3, according to certain axis, on the assumption that the rotation amount (25) from a reference value x (20), a rotation amount necessary for validating a rotation amount are threshold1 (21) and threshold2 (22), the maximum rotation amount are max1 (23) and max2 (24), and a value when the rotation amount is invalid is set to zero, a value of an input value joy of one axis is determined as the following pseudo-codes.

```
If (x > max1) x = max1
If (x < max2) x = max2
If (x > threshold1){
joy = (x-threshold1)/(max1-threshold1) * 100.0
}
if (x < threshold2){
joy = (x-threshold2)/(max2-threshold2) * 100.0
}
if (x < threshold1 && x > threshold2){
joy = 0.0;
}
```

Figure 6:
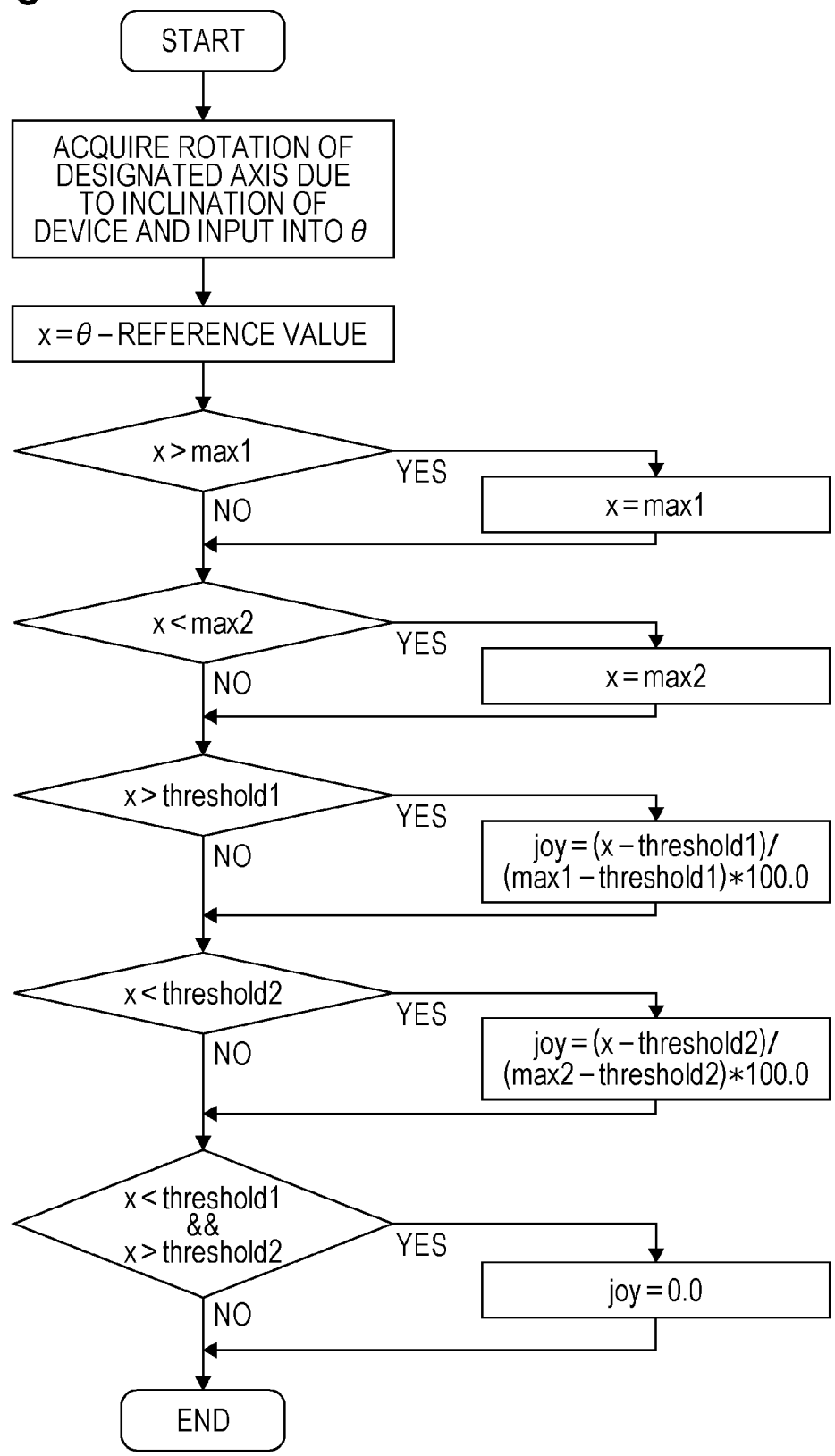
FIG. 6 is a flow chart for determining a numerical value.

A flowchart is shown in FIG. 6. Here, although the value of joy is a numerical value in a range of −100 to 100, it is possible to change the value in any range if needed. It may be permissible to multiply with another value instead of *100.

By setting threshold1 (21) and threshold2 (22), they function to ignore a rotation with an arbitrarily fixed rotation amount and make it easy to make an input value into an input invalidate state.

By setting max1 (23) and max2 (24), it is made possible to set the rotation amount that causes input value to be the maximum.

Here, it is made possible to set freely, if needed, a reference value (20), threshold1 (21), threshold2 (22), max1 (23), and max2 (24) as parameter values that can be set individually for each rotation axis.

For example, according to a reference value (20), a reset button (80) or the like is provided and the orientation of the device when a button has been pushed, is set as a reference orientation. The reference value (20) is a rotation amount when the orientation of the device has not been changed from the reference orientation. Since the reference orientation is taken into consideration in the processing that determines the above-described rotation amount, the reference value may be zero basically, but may be non-zero if necessary. When the reference value (20) is a value of non-zero, a reference orientation has been caused to be rotated on the rotation axis according to the value.

According to this, it makes possible for a user to adjust simply a reference orientation at the time of calculating the rotation amount of a device so as to match user's preference.

The numerical value inputs, obtained in the above ways, based on rotation of the x axis (61) and y axis (62) are called joy_x and joy_y, respectively.

Movement of a character in a virtual space will be described.

An example of the embodiment shown here is a game that operates a character capable of performing movement to front-back and left-right in the virtual space and an action of a jump and an attack. Although operation for a character in a third-person perspective will be mainly described below, operation for a character in a first-person perspective can be performed similarly.

Examples of the above-described game are a first-person shooting game and a third-person shooting game.

A character is to move in a direction according to the rotation amount from the reference orientation of the device (60).

The moving direction of a character is determined on the basis of the direction in which a camera in the virtual space faces.

The movement of a character is performed on the basis of the values of joy_x and joy_y. In more concrete terms, as shown in (a) of FIG. 10, on the basis of the value of joy_x, the movement in the front-back direction as seen from the camera is performed. When the device is rotated in the direction to incline to the back, a character is to move in the direction to the back (left side in (a) of FIG. 10) as seen from the camera, and when the device is rotated in the opposite direction, the character is to move in the direction to the front (right side in (a) of FIG. 10).

Figure 10:
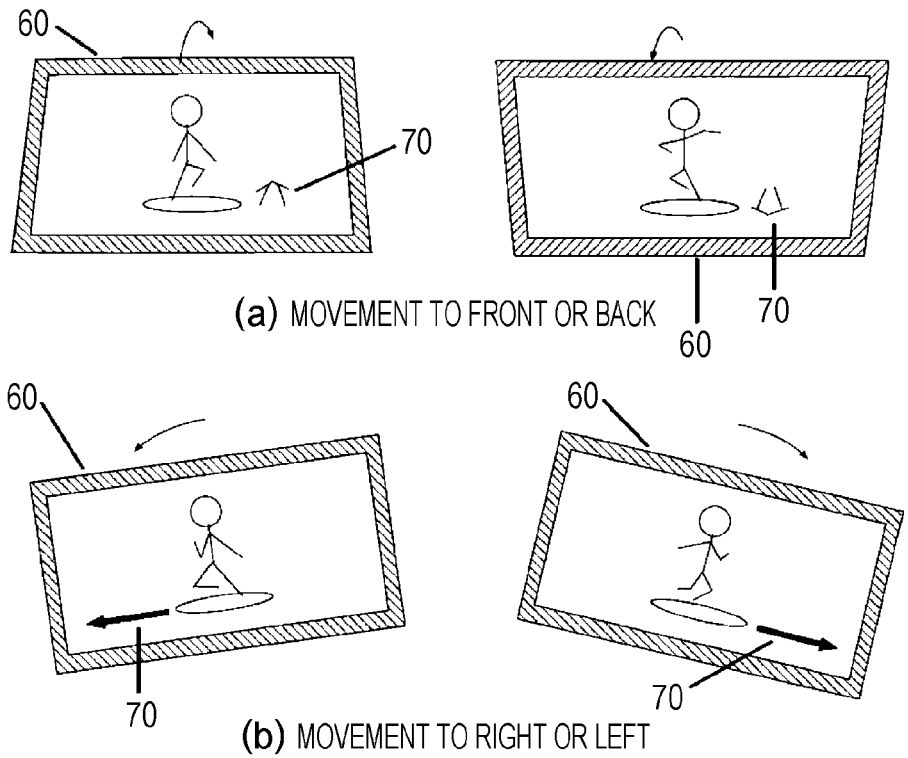
FIG. 10 is an explanatory diagram of movement of a character.

As shown in (b) of FIG. 10, depending on the value of joy_y, the movement in the left-right direction, as seen from a perspective, is performed. When the device is rotated in the direction to incline to the right, a character is to move in the direction to the right (right side in (b) of FIG. 10) as seen from the camera, and when the device is rotated in the direction to incline to the left, the character is to move in the direction to the left (left side in (b) of FIG. 10).

Here, a movement of the character relative to the inclination of the device is an example, and the movement of a character changes depending on how to take the rotation axis and the determining method of a rotation amount.

The processing in connection with movement here is an example, and movement of a character may be determined by another method based on the values of joy_x and joy_y. For example, instead of a camera, the character is moved in the front-back and left-right directions as seen from the front of the character.

The moving speed of a character is determined according to the values of joy_x and joy_y.

According to the value of joy_x, the moving speed of the front-back direction of a character is determined, and according to the value of joy_y, the moving speed of the left-right direction of a character is determined.

Here, the moving direction to the front of a character is defined as an observing direction of the camera that observes the character. According to the value of joy_x, a character is to move in the front-back direction as seen from the camera. According to the value of joy_y, a character is to move in the left-right direction as seen from the camera.

Alternatively, the moving direction toward the front of a character is the front direction of the character, i.e., the direction in which the character faces. According to the value of joy_x, a character is to move in the front-back direction, and according to the value of joy_y, a character is caused to rotate.

When joy_x and joy_y are non-zero, a character moves so as to curve, and when joy_x is zero and joy_y is non-zero, a character rotates on that spot. When joy_x is non-zero and joy_y is zero, a character goes straight.

Special cases according to the determining method of the rotation axis are described. It is assumed that a designer and a user can determine the conditions to apply these special cases and whether to apply these cases.

Description is given to an operation in a case of that a user is operating a device on user's back and the screen of a device faces downward.

A state where the device faces downward is namely a case of that an orientation in which the Dz axis (63) of the device faces downward is a reference orientation. In this case, the x axis (64) is to match the Dx axis (61), and the z axis (66) is the same as the direction opposite to a gravity direction.

The movement of a character in the front-back direction is performed according to the rotation around of the Dx axis (61). When an upper portion of the device is rotated in the direction to incline to the back, a character is to move forward (left side in (a) of FIG. 10) as seen from the camera, and when it is rotated in the direction to incline to the front, the character is to move backward (right side in (a) of FIG. 10) as seen from the camera.

The movement of the character in the left-right direction is performed according to the rotation around of the y axis (65). At this time, the character is to move in the direction of the inclining of the device by the rotation around the y axis (65). That is, when the device rotates such that the right side of the device lowers, the character is to move rightward, and when the device rotates such that the left side of the device lowers, the character is to move leftward.

Alternatively, in the case of that an orientation in which the Dz axis (63) of the device faces downward, is the reference orientation, the x axis (64) is to match the Dx axis (61), and the z axis (66) is the same as the gravity direction.

At this time, the moving direction of the character according to the rotation direction of the y-axis (65) becomes such that left and right are reversed when the z-axis (66) is the same as the direction opposite to the gravity direction.

That is, by causing the device to rotate such that the right side of the device becomes upper, the character is to move rightward, and by causing the device to rotate such that the left side of the device becomes upper, the character is to move leftward.

According to the moving direction in the left-right direction, there are a method of causing the device to move in the direction of the downward inclining of device, and a method of causing the device to move in the direction of the backward inclining device as seen from a user. Since which one can be operated more intuitively, varies depending on the user, it is preferable to make it possible to be set arbitrarily.

According to movement in the front-back direction, the moving direction according to a rotation direction may be reversed.

Description is given to an operation when a reference orientation of a device is a lateral orientation. An example is a case of that a user is operating the device while lying sideways.

In the case of that the rotation amount around the Dx axis (61) is used, when the reference orientation of the device becomes a lateral orientation, the Dx axis (61) becomes parallel to or close to parallel to the direction of gravity.

When the rotation axis becomes parallel or close to parallel to the direction of gravity, a combination of only an acceleration sensor and an angular velocity sensor, that is a general inclination calculation means, may cause a deviation in the rotation amount in the direction of gravity. This is because an error in an integral value of the angular velocity sensor cannot be corrected by the gravity obtained from the acceleration sensor in the rotation in the direction of gravity. Accordingly, the rotation amount in the direction of gravity deviates with time, and as a result, the reference orientation changes unintentionally with time.

In the case of that the reference orientation unintentionally changes, may cause a fear to hinder comfortable operation.

As an example of solution, the rotation axes of the x axis (64), the y axis (65), and the z axis (66) are determined such that the rotation axis that detects the rotation amount for determining at least joy_x and joy_y according to the reference orientation of the device (60), does not becomes parallel or close to parallel to the gravity direction.

In a more specific example, according to rotation of the Dz axis (63), the character is to move in the front-back direction. According to the rotation of the Dy axis (62), the character is to move in the left-right direction.

That is, the x axis (64) is made parallel or close to parallel to the Dz axis (63), and the y axis (65) is made parallel or close to parallel to the Dy axis (62).

Another example of the solution is to correct the deviation by using a means capable of detecting rotation around the axis of gravity, such as a geomagnetic sensor.

Depending on change of the orientation of the device, there is a case of that a rotation amount may not be detected appropriately on each axis. Such a case includes detecting the rotation amount around gimbal lock and singular points.

In such a situation, the rotation axis and the reference orientation are updated so as to eliminate the former situation. At this time, correction is added to the rotation amount of each axis on the new rotation axis and reference orientation so that the current rotation amount of each axis does not change due to the new rotation axis and reference orientation.

It is made possible to set a condition that causes the rotation amount to be valid. While the rotation amount is not valid, the rotation amount is set to a predetermined value. For example, while the rotation amount is not valid, the rotation amount is set to zero. The condition for validating the rotation amount is related to a period during which an arbitrarily determined input not causing the change in the orientation of the device, is performed and a predetermined period after the input is completed.

For example, only while the touch input is performed simultaneously, a rotation amount is made valid.

The setting of a reference orientation is described.

It is assumed that the reference orientation of the device can be set by a user at an arbitrary timing using a button or the like. For example, the orientation of the device (60) is set as a reference orientation when the button is pressed or released. Moreover, the character may be set not to move while the button is pressed. While the button is pressed, or while the reference orientation is set, the moving speed of the character is set to zero. When the reference orientation is reset, the rotation axis may be reset at the same time.

According to the other setting timings of a reference orientation, a setting screen for a reference orientation is provided, whereby it is made possible for a user to set an arbitrary reference orientation.

An orientation of the device when a pause screen or a menu screen is turned to a state to operate the character, is set as a reference orientation. At this time, a confirmation screen may be provided before performing a moving operation for a character, whereby a margin may be provided for a user to set the reference orientation. This setting screen is ended after user input or after a certain time has elapsed, and an operation for the character is started.

Further, the movement operation for a character may be not to start immediately after the setting of the reference orientation, whereby a user may be provided with a margin for determining the character moving direction immediately after the start of the character operation.

When the state of the device (60) satisfies a predetermined condition, the operation for the character is not accepted. The predetermined condition is, for example, a situation that the device (60) falls. At this time, the moving operation of a character is interrupted by opening a menu screen or the like.

If necessary, a means for indicating the moving direction of the character by the above method is provided. In this embodiment, an arrow (70) indicating the moving direction with joy_x and joy_y is displayed around the character. The direction of the arrow indicates the moving direction based on joy_x and joy_y, and the magnitude of the arrow indicates the speed of the movement. In the present embodiment, when a vector having joy_x and joy_y as components is considered, the direction of the arrow indicates the direction of the vector, and the size of the arrow indicates the magnitude of the vector.

The arrow may be displayed, for example, on the edge of the screen excepting the region around the character. How to display the allow can be designed arbitrarily by a program designer.

The operation of the camera in a space where the character exists is operated on the basis of a touch input in a camera operation region (81) designated in the touch display. The shape and number of the camera operation regions (81) may be arbitrarily determined. Moreover, the camera operation region (81) may be provided on the touch input detection surface of the touch input detection means that does not include a display. Examples of the case of taking such a mode, include, a case of that video image is output to a display separated from the device (60), a case of that the display and the touch input detection means are separated, and a case of that video output is not needed.

The camera in the space of the character to be operated is operated with respect to the input values in the top-bottom direction and the left-right direction.

The input values in the top-bottom direction and the left-right direction are determined on the basis of the touch input in the camera operation region (81).

The movement of a camera may be to automatically move according to the situation. For example, a control of the camera is performed so as to avoid obstacle objects. Alternatively, in the case of that the input is not detected for a certain period of time, that is, in the case of that the touch input is not performed or has not changed, the control of the camera is performed to automatically become a predetermined direction according to the direction of the character, for example, the camera automatically faces the front of the character.

In the present embodiment, the perspective is changed on the basis of the slide direction and amount of the touch input that has been performed in the camera operation region (81). As an example, the perspective may be rotated around an arbitrary vertical axis as a center in the game space according to a slide in the lateral direction, and may be rotated around an arbitrary vertical axis in the game space according to a slide in the longitudinal direction. A more detailed example is an axis that penetrates a player in the game space with respect to the axis.

The camera can be operated in the top-bottom direction and the left-right direction. The operation and movement of the camera will be described below. The operation of the camera described in the following description is an example, and any method may be used as long as the operation in two directions among the camera operations such as the top-bottom direction and the left-right direction can be operated according to a touch input.

Figure 12:
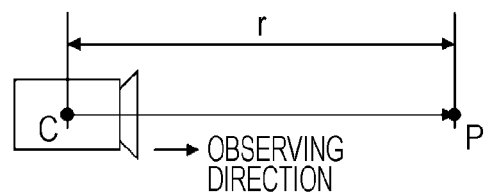
FIG. 12 illustrates operating method 1 of a camera.

The first method of camera movement is that a camera rotates in the top-bottom direction and the left-right direction at an arbitrary point that makes the character a reference. As shown in FIG. 12, the camera sets a point C as a camera position, a point P as the rotation center of the camera with respect to the character, and r as a distance between the point C and the point P. When the camera position point C is behind the character and the camera catches the character, it becomes a third-person perspective, and when the camera position point C is in front of the character or at the same point as the character's position, it becomes the first-person perspective.

The value of r can be changed by the user's operation or automatically. In an example of changing automatically, the value of r changes according to movement in the top-bottom direction. For example, when the camera faces downward in the third-person perspective, the value of r is increased so as to look down on the character. In another example, the value of r is automatically changed so that the camera avoids obstacle objects in space.

Figure 13:
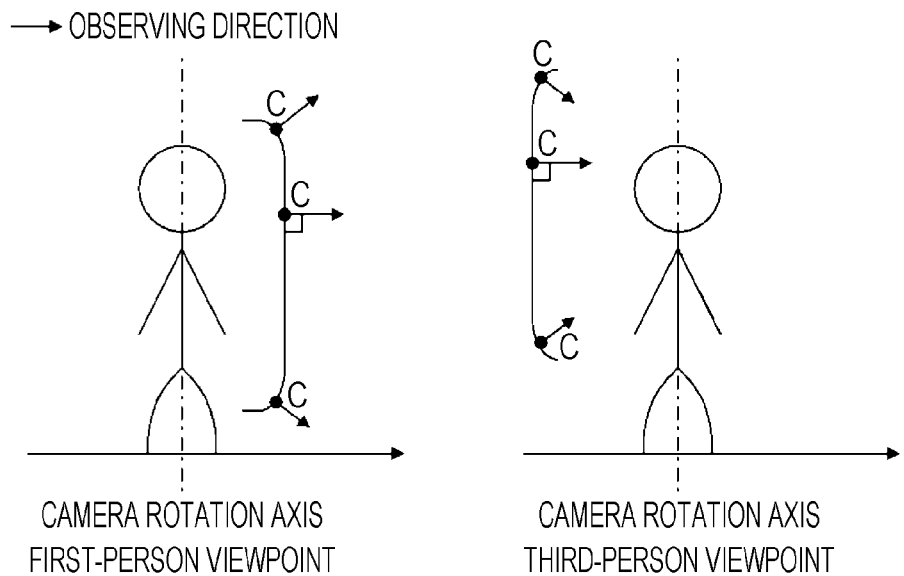
FIG. 13 illustrates operating method 2 of a camera.

As shown in FIG. 13, in the second method of camera movement, a trajectory is set for the movement of the camera in the top-bottom direction, and the camera position point C is moved on the trajectory in response to the input in the top-bottom direction. The trajectory is set on the basis of the rotation axis of the camera in the left-right direction. The rotation axis of the camera in the left-right direction is set on the basis of the character.

Figure 14:
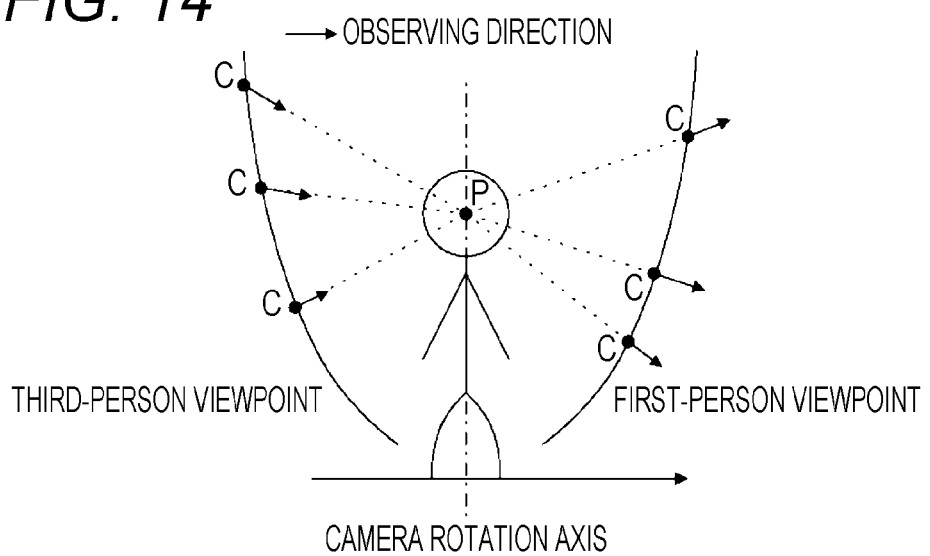
FIG. 14 illustrates operating method 3 of a camera.

As shown in FIG. 14, the observing direction of the camera may be caused to face the point P referencing the character. Similarly to the point C, the point P may be moved in accordance with an input in the top-bottom direction or a control state.

When the camera is moved beyond the movable range of the point C or the point P, the distance r between the point C and the point P may be caused to be further changed instead. For example, when the point C is tried to be moved upward beyond the range, a wide range becomes visible alternatively increasing the value of r.

An operation of an aim will be described. The aim is to indicate an action point for performing some action or function. For example, in a shooting game, the aim specifies the firing direction and landing point of the bullet to be fired. In addition, the aim specifies the attack direction and position. A moving the aim is namely moving the action point. Here, the action point means a point or direction in which the action or function is performed.

In this embodiment, an aim (130) is a point displayed on the screen of the device, and the action point is a point of the space where the screen overlapping the aim (130) on the screen is captured. For example, if the aim (130) overlaps the target in the virtual space, the point of action will be the target, and if the action of firing a bullet is performed, the bullet will be fired toward that target. This is merely an example, and the function of the aim (130) is determined according to the application.

The aim (130) may be fixed to an arbitrary point. For example, the aim (130) is fixed to the center of a screen. At this time, by changing the observing direction of the camera, the action point will be changed.

The aim is to move within an aim movement region (131) on the screen according to the input values in the top-bottom and left-right directions by a touch input in the camera operation region (81). The aim is caused not to come out of the aim movement region (131). The shape of the aim movement region (131) may be determined arbitrarily.

According to the input value of the left-right direction, the aim is to move leftward and rightward, and according to the input value of the top-bottom direction, the aim (130) is moved upward and downward.

The operation of the aim (130) accompanied by the camera operation will be described.

When both the aim and the camera are operated, both are performed in response to a touch input in the camera operation region (81). The movement of the camera is changed between a case of that the aim (130) is within the aim movement region (131) and a case of that the aim (130) tries to come out from the aim movement region (131).

When the aim (130) is within the aim movement region (131), the camera is caused not to move.

Alternatively, the aim (130) and a camera are moved simultaneously. At this time, the moving speed of the camera may be reduced as compared with a case of coming out of the aim movement region (131).

Figure 15:
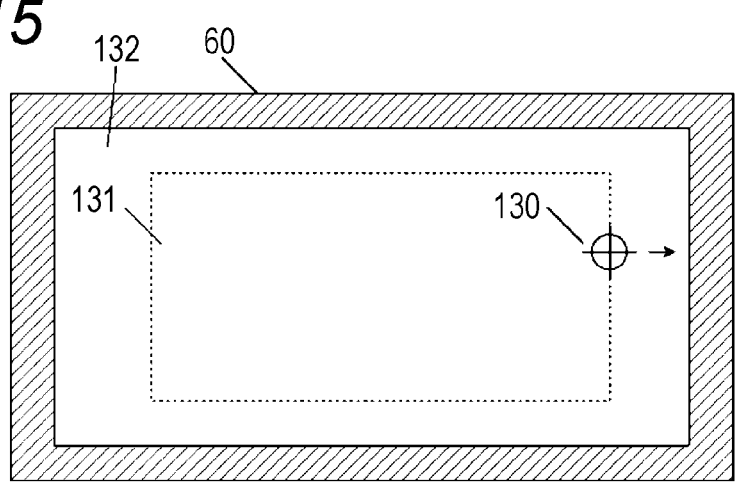
FIG. 15 illustrates an explanatory diagram of an aim.

When the aim (130) tries to come out of the aim movement region (131), the camera is moved in accordance with the direction in which the aim tries to go out. At this time, the aim (130) is kept within the aim movement region (131). At this time, the agility of the camera may becomes higher than that when the aim is within the aim region. For example, when the aim moves to the right as shown in FIG. 15 and comes out to the right side of the aim movement region (131), the camera is rotated at a speed corresponding to the moving speed of the aim.

In the case of handling the movement of the aim and the aim movement region separately in terms of the top-bottom direction component and the left-right direction component, according to the movement of the aim in the diagonal direction, for example, when only the left-right direction component is out of the aim movement region (131), whether to move the camera only in the left-right direction or whether to move it also in the top-bottom direction may be determined arbitrarily.

Figure 16:
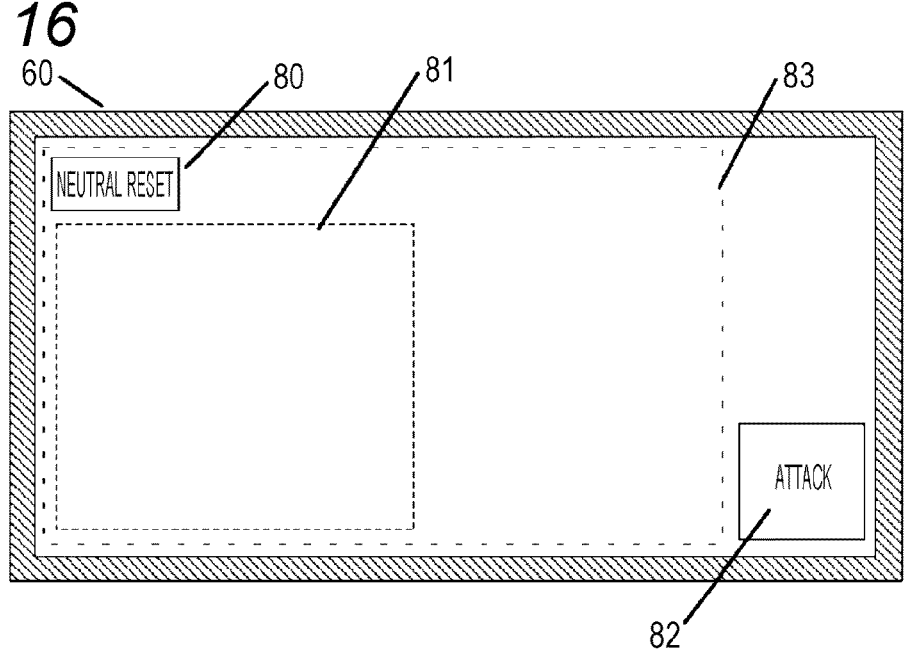
FIG. 16 illustrates an example of arrangement of a touch region and a button.

As shown in FIG. 16, a camera operation region (81) is set in a touch detector plane. Note that this is an example and the camera operation region (81) may be an arbitrary region. The camera operation region (81) may be divided into a plurality of regions. The control of camera and the aiming are performed according to the touch input in the camera operation region (81). The input values of the top-bottom direction and the left-right direction are determined according to a touch input, and the aim and the camera are operated according to the input values. Hereinafter, although an example according to the operation of the camera is mainly shown, it is the same also according to that of the aim.

Here, a series from the detection start of a touch point to becoming undetected is referred to as a touch input. The first touch detection point is referred to as a touch start point, the current touch detection point is referred to as a touch point, and the last touch detection point when the touch point becomes undetected is referred to as a touch end point. A touch input is manageable independently for each detection of a touch point, and it is also possible to handle multiple touch inputs simultaneously.

For example, it makes possible to perform simultaneously a touch button and a camera operation by movement of a touch point.

In an example of the determining method, an input value of the top-bottom and left-right directions by a touch input, is determined according to the moving direction and speed of a touch point. The input values in the top-bottom direction and the left-right direction are determined according to the top-bottom direction component and the left-right direction component of the direction and amount that the touch point has moved immediately before, for example, the latest time or the program step.

Here, it is assumed that the top-bottom and left-right directions of a touch input are to match that of the device (60).

For example, when a touch input such as tracing the touch surface to the right is performed, an input value in the left-right direction is given, and the camera faces the right or the aim moves to the right.

When the touch input is finished under a predetermined condition, the input in the top-bottom direction and the left-right direction corresponding to the touch input is continued.

When the touch input is completed in a state where the moving speed at an arbitrary time nearest the touch point is a predetermined speed or higher, according to the moving direction and moving speed at the touch point at the arbitrary time, an input in the top-bottom direction and the left-right direction corresponding to the touch input is continued. For example, when the camera is operated, a camera continues moving after the end of a touch input.

The input value under continuation in the top-bottom direction and the left-right direction may be to decrease gradually with time. Finally, the input value becomes zero, and, for example, a camera and an aim will stop.

As an example of the operation, when a touch input is performed such that the touch surface is flipped to the right, the camera continues to rotate to the right, and the rotation speed gradually decreases and finally stops. Similar to the top-bottom direction of a camera, when a movable range has a maximum, it does not move any more.

Also, the same applies to that of the aim, and by a matter that the aim tries to come out from the aim movement region (131) by continuation, the camera moves.

When a touch input for determining a new input value in the top-bottom direction and the left-right direction is performed during this continuous input, the continued input is ended. That is, when a camera is operated and moves continuously by continuous input, if a new touch input is performed on the camera operation region, the camera stops, and then the camera is moved according to the movement of a touch point of the touch input.

Even in the case of that the touch point comes out of the camera operation region (81) due to the movement of the touch point during the touch input, various operations corresponding to the touch input may be continued.

In the case of that the touch point of the touch input whose touch start point is located out of the camera operation region (81) has been within the camera operation region (81), various operations according to the touch input may not be performed. That is, the input value in the top-bottom direction and the left-right direction for operating the camera and the aim is determined according to the touch input in which the touch start point is in the camera operation region.

The processing for determining the input value of the top-bottom and left-right directions may be started from the touch point having been within the camera operation region (81) as a touch start point.

In another method of the determining, the input value of the top-bottom and left-right directions is determined according to the position of the touch point from the arbitrary origin. This is a so-called virtual putt. The origin may be a touch start point and may be also an arbitrary fixing point.

Description will be given to an executing method of other actions and arbitrary functions. Here, although an executing method of an attack action and a jump action of a character is described, this is an example, and an action to be executed, function, and an executing method are appropriately set correspondingly to an application.

According to the attack of the character, an attack button (82) is disposed in the touch display, and when the button is pressed, a character performs an attack action corresponding to the button.

An example of the attack action is shooting in a third-person shooting game or a first-person shooting game. When the attack button (82) is pressed, the character fires a bullet toward a point indicated by the aim (130).

In addition, as an example of an arbitrary function, a menu call button may be arranged, and, when the button is pressed, a menu screen may be called.

According to the jumping of the character, in this embodiment, a touch gesture region (83) is set in the touch display, and when a double tap is performed in the region, the character performs a jump action.

Here, the timing of the jump action by double tap is assumed when the touch input is finished within a predetermined time and a touch input is started within a predetermined time. This touch input enables further operation of the camera and the perspective, thereby enabling smooth operation of the camera and the aim (130) after the jump.

Processing and actions corresponding to buttons and touch gestures in the touch display can be arbitrarily set according to the application excepting those exemplified here. Of course, any touch gesture excepting the double tap may be used.

Conditions for moving the character according to the orientation of the device (60) may be set.

For example, the character is moved while the camera and the aim are operated, while a predetermined action such as the attack or jump is performed, and only during a predetermined time, if necessary, after these are ended.

The phrase "while the camera and the aim are operated" may include a period of time when the operation of the camera and the aim corresponding to the touch input is continued even after the touch input has been ended.

The character is enabled to move also during a period until a predetermined time elapses after the input has been completed.

According to this, when a touch point becomes likely to come out of a touch input detectable surface and a touch input is performed again, the movement of a character is made possible also while the touch input is not performed.

The predetermined period may be determined according to the state of an input or a system. For example, the predetermined period is zero for the button and is a value according to the amount of a change of the last touch input for the touch input.

If necessary, a function for performing an operation for enabling confirmation of a current input value by numerical input based on orientation information, is added.

By way of example, a means of confirmation is provided by any combination of the methods described below.

(1) According to an input value, a numerical value indication, an indication with a bar, and a direction indication (70) by an arrow are added to a screen, and confirmation is made possible visually.

(2) According to an input value, a sound is made by changing the kind of sound and volume, whereby confirmation is made possible acoustically.

(3) According to an input value, the strength of vibration and the manner of vibration are changed by the vibration function of the device, whereby confirmation is made possible by a tactile sense.

(4) According to an input value, a force sense given by a device having a function of giving a force sense is changed, whereby confirmation is made possible by a force sense.

Figure 2:
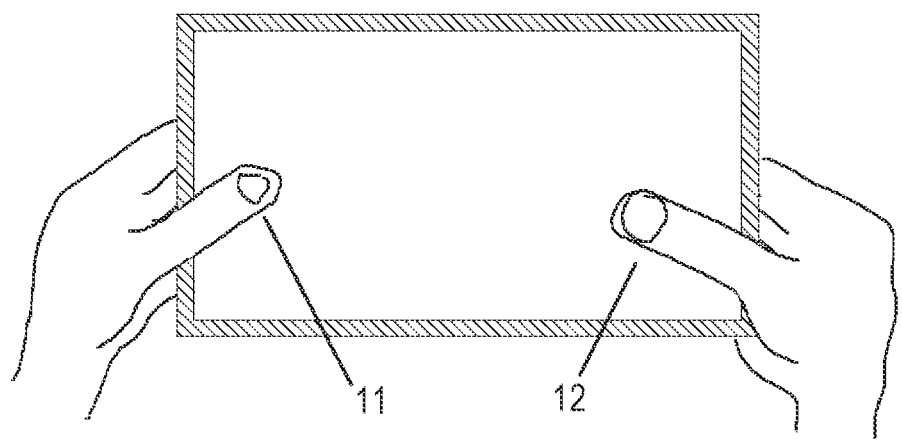
FIG. 2 illustrates an example of how to hold: holding with a lateral orientation.

By using the present invention, in a game that operates characters that can move in front and back and right and left and perform actions such as jump and attack in a virtual space described in the present embodiment, when the operation is performed by how to hold shown in FIG. 2, the movement processing of a character is performed on the basis of the numerical input obtained by the orientation calculation program, operations for the camera and the aim are performed with the left thumb, and actions such as attacks are performed with the right thumb, whereby it is made possible to operate the movement of a character, the operation of a camera and an aim, and an action such as attack simultaneously and independently. Accordingly, it is possible to provide a user with an operation for a character with higher flexibility. The right thumb and the left thumb may be reversed, of course.

Figure 1:
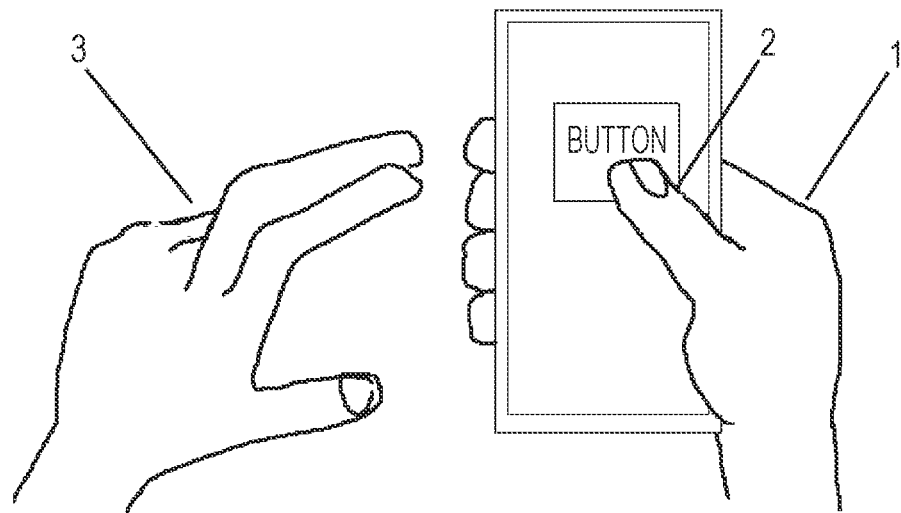
FIG. 1 illustrates an example of how to hold: holding with a longitudinal orientation.

Moreover, also in how to hold shown in FIG. 1, operations corresponding to two inputs can be performed simultaneously and independently by numerical input obtained by the orientation calculation program and the thumb of the hand holding the device. In addition, input using a hand that does not hold the device can be performed simultaneously and independently.

Moreover, as compared with a method in which a change in device orientation is linked with the movement of a camera, in the present embodiment, the moving speed of a character is determined according to a change in device orientation, an amount to make the orientation of a device change from a reference orientation necessary for satisfying an operation for a character is enough to be small. Therefore, more comfortable operation can be offered.

For the calling of operation of a camera and an aim, actions such as attacks, and arbitrary functions, buttons of an actual device or signals of analog stick input may be used, instead of using touch inputting means.

Up to this point, an embodiment of a program of a third-person character game has been shown. However, the orientation calculation program and the processing according to the movement of a character may be executed as a program module. This program module may be implemented as a part of an arbitrary program of an application.

At this time, the above-described processing is implemented with a library, a source code, a function, etc. These are one example of an implementing method for incorporating into an arbitrary program, and other methods may be used.

Alternatively, an arbitrary program can be implemented as a program independent of the arbitrary program that can use the rotation amount or a numerical value corresponding to the rotation amount.

For example, the arbitrary program may be implemented as a program which generates a signal equivalent to the direction instruction input by the analog stick of a game controller. The arbitrary program may be implemented like a so-called device driver of the game controller.

According to the direction indication input, a value corresponding to a signal when the stick is tilted in the lateral direction is determined according to the joy_y, and a signal corresponding to a signal when the stick is tilted in the longitudinal direction is determined according to the joy_x.

For example, while the device driver is valid, a direction instruction input signal is generated in a computer system to be executed, and the system performs processing according to the direction instruction signal.

For example, in the case of that software corresponding to the analog stick is executed, an operation of the analog stick corresponding to an inclination of the device is made possible.

In addition, by generating a signal equivalent to the signal generated according to the button of the game controller in response to the touch input, the operation of the software corresponding to the button is made possible, similarly to the case of the direction instruction input. In the above-described virtual putt, the direction instruction signal by an analog stick is generated.

When drawing a user interface for touch input such as a touch button or virtual putt, the user interface is drawn on the forefront of the screen. Furthermore, arbitrary permeation processing may be performed.

Moreover, in the case of that the detection of the touch input according to the present application overlaps with the detection of the original touch input, the processing for the touch input according to the present application may be performed with priority and the processing of the original touch input may be ignored.

For example, in the case of that the program of an application has a touch button UI, the touch gesture region (83) is set so as to cover the button UI by the program of the present application, the touch input to the button UI is ignored.

The detection of a touch input according to the present application may be not to overlap with the original detection of a touch input.

With the above-described combination, for example, in a computer having an orientation detecting means and a touch display, even if there is not provided the game controller, it is made possible to operate software corresponding to the game controller by an operation to incline the device and a touch input.

Figure 17:
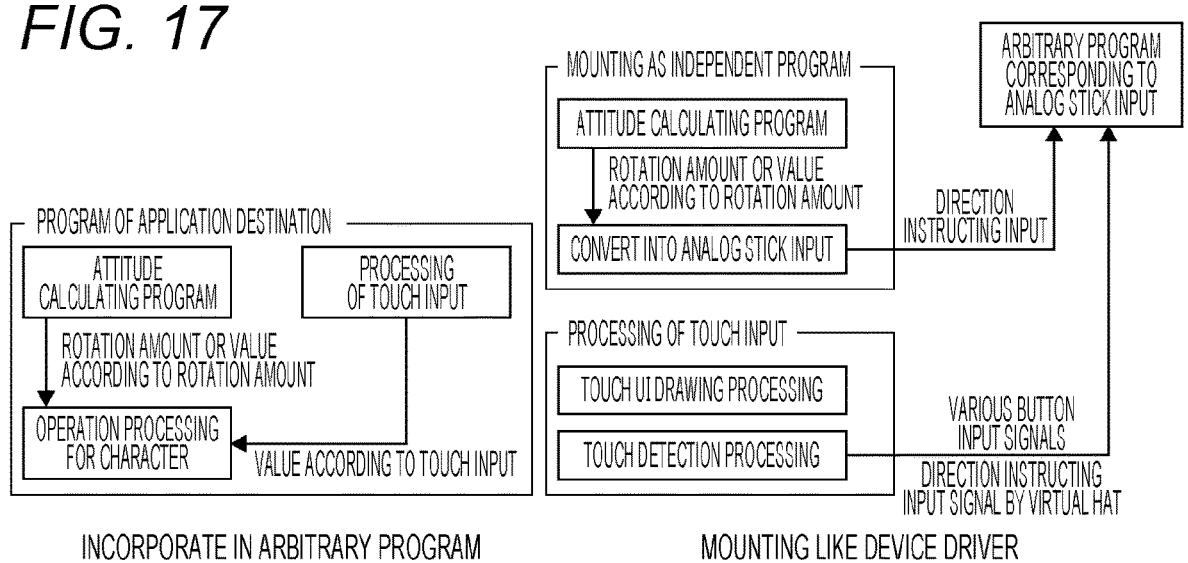
FIG. 17 illustrates an implementation example of a program.

FIG. 17 shows an example of a system configuration in a case (left side in FIG. 17) of implementing the processing so as to incorporate in an arbitrary program and in a case (right side in FIG. 17) of implementing the processing so as to be a device driver. This is merely an example, and how to implement the processing may be determined each designer.

In a case (left side in FIG. 17) of implementing the processing so as to incorporate in an arbitrary program, although only an orientation calculation program, character operation processing, and processing of a touch input have been described, naturally the processing excepting these is also included in the program of an application. Naturally, it may be permissible to include only an orientation calculation program.

In a case (right side in FIG. 17) of implementing the processing so as to be a device driver, the analog stick input value is determined according to the rotation amount obtained from the orientation calculation program and is transmitted to the system such that an arbitrary program corresponding to the analog stick input can be used. Similarly, in the processing of the touch input, the button input signal is transmitted to the system so that an arbitrary program corresponding to the button input of the game controller can be used.

It is assumed that the processing of a touch input is implemented if needed. Moreover, a portion of the orientation calculation program and a portion of the processing of the touch input may be combined into one.

Up to this point, the operation of the character in the virtual space has been described, and, of course, the present invention may be applied to operation of a moving object in the real world. At this time, the above-described character corresponds to a moving object. For example, the moving object is a traveling vehicle and a robot that can be controlled wirelessly. Moreover, the observing means is a camera, etc. provided in the above-described moving object.

The movement of the moving object may be performed according to the value of joy_x and joy_y, similarly to the case of the above-described character.

The moving method of the moving object may be one corresponding to the moving object. For example, in the case of a mobile robot that can move in all directions without changing the orientation, the moving speed in the front-back and left-right directions is determined according to joy_x and joy_y, and a change of the orientation is performed in accordance with the input value in the left-right direction corresponding to the touch input. Moreover, in the case of that the observing means is provided, a change of the observing direction in the top-bottom direction of the observing means may be performed according to the input value in the top-bottom direction corresponding to the touch input.

In another example, the moving speed of the moving object in the front-back direction may be determined according to joy_x, and the swing speed of the moving object may be determined according to the value of joy_y. At this time, in the case of that the observing means is provided, according to a change of the observing direction, a change of the top-bottom observing directions may be performed in accordance with an input value in the top-bottom direction according to the touch input, and a change of the left-right of the observing direction and the rotation direction may be performed in accordance with an input value in the top-bottom direction according to the touch input.

According to processing in which the rotation amount is invalidated and to be a predetermined value, or to be ignored, when a plurality of rotation amounts are handled, determination to invalidate each of the rotation amounts is performed in consideration of rotation on other rotation axis.

Moreover, it is made possible to provide a difference between a condition to validate the rotation amount and a condition to invalidate the rotation amount.

Description is given to a second example according to a range in which the rotation amount is invalidated and to be a predetermined value or to be ignored. A vector that includes rotation amounts on a plurality of rotation axes is considered. The arbitrary regions of the vector that invalidate respective rotation amounts are determined, and when the vector is in the region, a corresponding rotation amount is treated as invalid. Furthermore, according to the rotation amount in the outside of the region, correction may be added to the rotation amount according to the region.

It is assumed that correction means to do such that a predetermined rotation amount when coming out of the region is made minimum, zero, or the same as a value at the time of being invalidated. In an example of the correction, it is made a rotation amount according to a vector according the rotation amount and a vector from the intersection with the boundary of the region to an end point of the vector corresponding to the rotation amount.

One example is shown below. For description, the rotation amounts of the two arbitrary rotation axes are denoted by "a" and "b", respectively, and the above-described vector is expressed as (a, b). It is assumed that a region to be made invalid is a circle with a radius r, and if a point (a, b) is inside the circle, the rotation amounts a and b are treated as invalid. The shape of the region is not limited to a circle, but may be, for example, oval or polygonal.

When a point (a, b) is on the region boundary, a rotation amount is made the minimum, zero, or a value when being invalidated, and according to a point (a, b) in the outside of the region, a rotation amount is to change from there.

The above-described correction is described.

Figure 18:
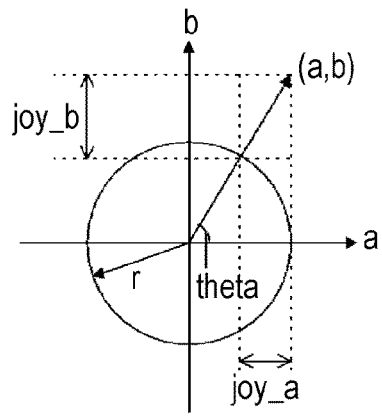
FIG. 18 illustrates example 2 of a determining method of a rotation amount.

For example, in the example in FIG. 18, the correction with which the magnitude of a vector (a, b) is reduced by r, is performed. When a new rotation amount and a numerical value corresponding to the rotation amount are expressed as joy_a and joy_b, respectively, it is assumed that:

$$joy\_a = a - r*\cos(theta), joy\_b = b - r*\sin(theta), \cos(theta) = b/(\text{sqrt}(a*a+b*b)), \sin(theta) = b/(\text{sqrt}(a*a+b*b)).$$

According to a range that invalidates the rotation amount and makes a predetermined value, or ignore, the third example will be described.

According to vector corresponding to rotation amounts on a plurality of rotation axes, arbitrary regions of the vector to invalidate respective rotation amounts are set. Furthermore, an arbitrary region X is set if needed.

In the case of that any of rotation amounts is valid, even in the case of that other rotation amount is invalid, the rotation amount is not handled as being invalid and may be handled such that the rotation amount has become a predetermined rotation amount at a time of being invalid.

For each rotation amount, in the outside of the region where the rotation amount is invalid, the rotation amount is a rotation amount according to a corresponding component of a vector including points indicated by the vector from a point within a region X closest to a point indicated by the vector.

Here, according to the rotation amount in the outside of the region, correction may be added to the rotation amount, similarly to the second example.

More specific description will be mentioned. For description, the rotation amounts of two arbitrary rotation axes are denoted by "a" and "b", respectively, and a vector according to the rotation amounts is expressed as (a, b).

The arbitrary regions that invalidate both a and b are set to AB, and arbitrary regions that invalidate only a or b are set to A and B, respectively, and a region that includes an arbitrary combination of them is set. Furthermore, an arbitrary region X is set if needed.

In the case of that any of rotation amounts is valid, even in the case of that other rotation amount is invalid, the rotation amount is not handled as being invalid and may be handled such that the rotation amount has become a predetermined rotation amount at a time of being invalid.

Figure 19:
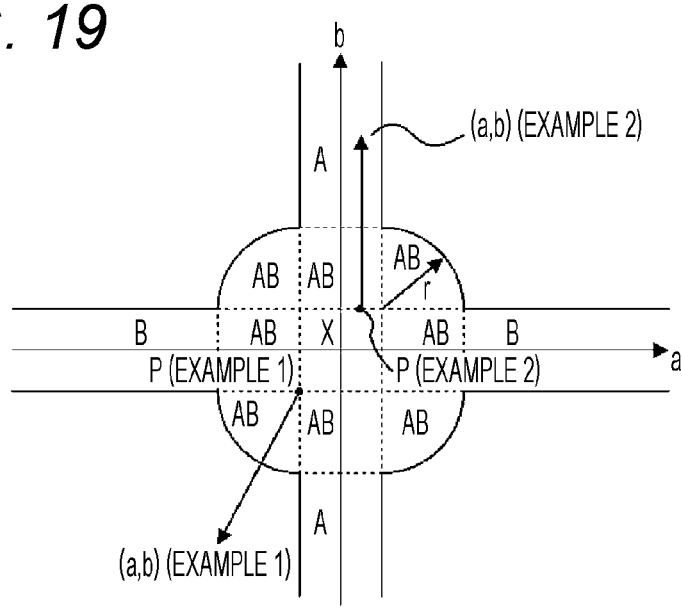
FIG. 19 illustrates Example 3 of a determining method of a rotation amount.

An operation example is described on the basis of FIG. 19. Here, it is assumed that regions A and B are considered to be infinite regions with widths Wa and Wb, respectively, and the region X is a region where A and B are superimposed on each other. A curvilinear part is a quarter of a circle with a radius r centered on the corner of X. This may be merely an example, and, for example, a curvilinear part may be an ellipse or a straight line or also a combination of those.

In the outside of a region to invalidate the rotation amount "a", "a" is a value according to a component, corresponding to "a", of a vector that includes a point (a, b) and a point (P of FIG. 19 (Example 1, Example 2)) within a region X nearest to the point (a, b). According to a rotation amount "b", similarly, in the outside of a region to invalidate the rotation amount "b", "b" is a value according to a component, corresponding to "b", of a vector that includes a point (a, b) and a point within a region X nearest to the point (a, b).

Here, according to a rotation amount in the outside of the region, correction may be added to the rotation amount. That is, it is made a numerical value corresponding to the rotation amount according to each component of a vector to (a, b) from an intersection between a vector from a point P to (a, b) and a boundary of the region that invalidates the rotation amount.

The fourth example according to a range in which the above-described rotation amount is invalidated and to be predetermined value or to be ignored, is described. The fourth example is based on the processing in the above-described third example. A rotation amount is determined according to each component of a vector that includes a point P nearest to a point indicated by a vector including a rotation amount in a region X when any of rotation amounts becomes valid, and the point indicated by the vector including the rotation amount.

Moreover, at this time, an arbitrary area Y based on the point P may be determined, and without depending on the region to invalidate, it may be made valid until a point indicated by a vector including the rotation amount is within the region Y.

Furthermore, according to each rotation amount, on the basis of a point P, regions to invalidate may be newly set while being valid. Also, according to these regions, it is assumed that correction is applied to the rotation amount.

Alternatively, in any of the second and third examples according to a range in which the above-described rotation amount is invalidated and to be a predetermined value or to be ignored, each region is reset while all the rotation amounts or at least one rotation amount is valid. At this time, the processing following any one of the second and third examples is performed. When all the rotation amounts or a rotation amount of an arbitrary rotation axis becomes invalid, it is caused to return to the original.

Figure 20:
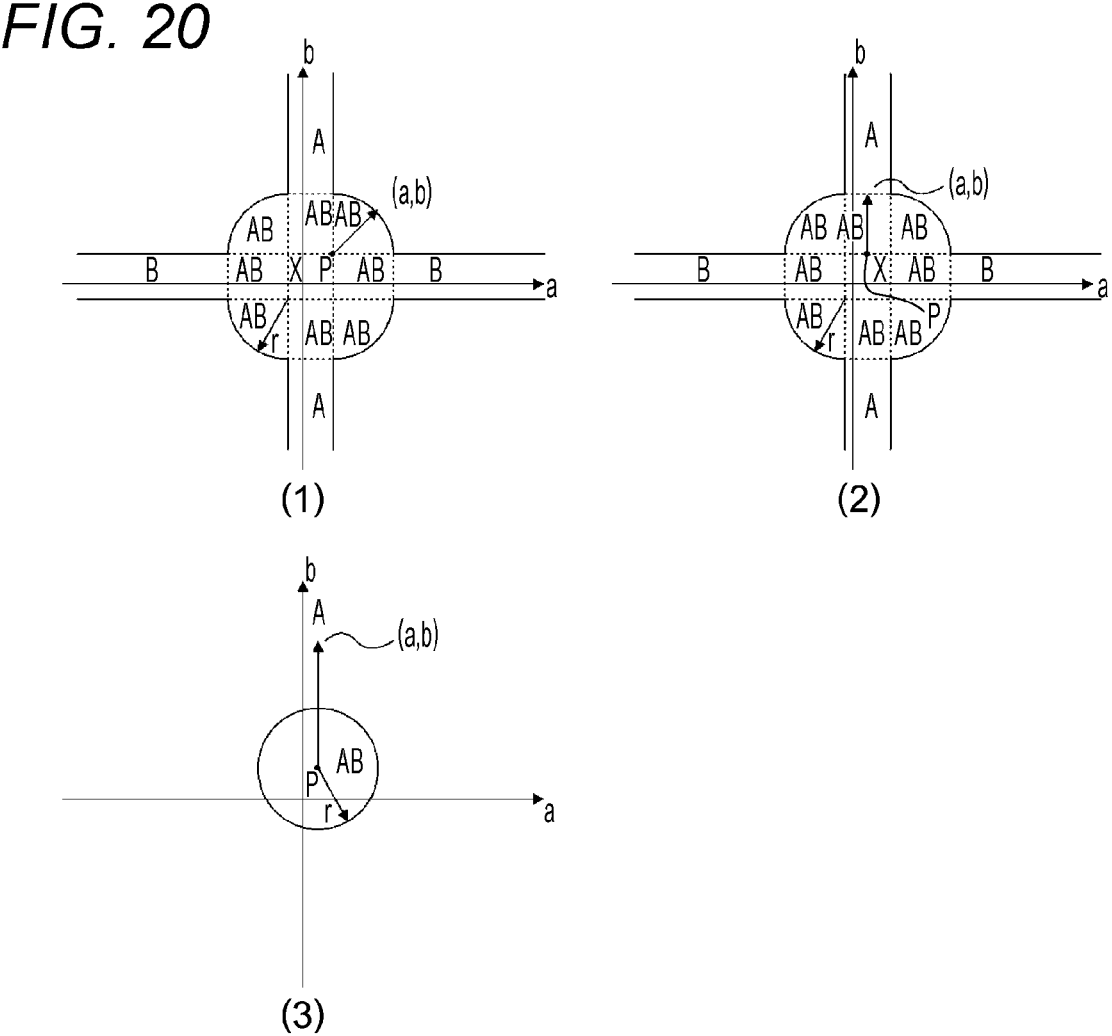
FIG. 20 illustrates Example 4 of a determining method of a rotation amount.

A more specific example is described on the basis of an example in the case of FIG. 19 and FIG. 20. The rotation amounts are determined according to each component of a vector including a point P nearest to a point (a, b) in the region X when any of the rotation amounts "a" and "b" of two arbitrary rotation axes becomes valid, and a point (a, b).

At this time, the region Y is made a circle of a radius r2 around a point P.

Alternatively, the region of FIG. 19 is reset such that the point P becomes a center. At this time, the region is changed such that the point (a, b) does not become an invalid region by the re-setting.

In an example of the specific re-setting, as shown in FIG. 20, the width of the regions A and B in FIG. 19 is changed.

At this time, the resetting is made such that a center is to match the point P.

Alternatively, the resetting is made such that a point (a, b) is located on the boundary of the invalid region, and the point P is located on the boundary of the region X. At this time, the region may be changed arbitrarily, and, for example, the above-described width may be eliminated (FIG. 20 (3)).

These changes may be changed according to a point (a, b) when having become valid. In one example, when a point (a, b) is in the regions A and B, the widths of the regions A and B are not set to zero, and in excepting that, in a case of that a point P is a point (a, b) that becomes a corner of the region X, in this example, the above-described widths may be set to 0 and the areas A and B may be eliminated.

In the processing according to the rotation amount up to here, naturally, the maximum value and the minimum value may be set and the control may be made not to exceed these ranges. The corrected rotation amount may be considered as a numerical value to be determined according to a rotation amount.

Moreover, with the above-described correction, the rotation amount may be made to change from a value non-zero. For example, the initial value of a rotation amount when having come out from the region to invalidate is made 10, and the rotation amount may be made to change from there continuously according to rotation of the device. The initial value may be determined according to the rotation of the device.

By performing the above processing, in the second example, it becomes possible to decide more finely a rotation amount when the rotation amount becomes valid. For example, when determining a vector from two rotation amounts, when the rotation has been made valid, it is made easy to take a vector of a diagonal direction.

In the third and fourth examples, when handling two rotation amounts, in addition to the above, it is made easy to perform an input to make one of the rotation amounts zero.

Moreover, depending on the setting of the region, it is possible to provide a difference between a condition to validate the rotation amount and a condition to invalidate the rotation amount. Accordingly, it becomes possible to provide more comfortable operation.

REFERENCE SIGNS LIST

1 Hand holding device
2 Thumb
3 Hand not holding device
11 Left hand thumb 12 Right hand thumb
20 Reference value of rotation
21 Threshold value for validating input
22 Threshold value for validating input
23 Maximum value of rotation
24 Maximum value of rotation
25 Rotation amount
60 Tablet device
61 Dx axis
62 Dy axis
63 Dz axis
64 x axis
65 y axis
66 z axis
67 x0 Axis
68 y0 Axis
69 z0 Axis
70 Indication showing moving direction
80 Reset button for reference orientation
81 Camera operation region
82 Button
83 Touch gesture region
100 CPU
101 Main memory
102 Auxiliary memory
103 Input section
104 Inclination calculating means
105 Touch inputting means
106 Display section
130 Aim
131 Aim movement region
132 Display

The invention claimed is:

1. A non-transitory computer-readable medium storing a program that causes a computer to calculate a rotation amount from a reference orientation of a device, wherein the program causes the computer to:

set an arbitrary coordinate system based on an arbitrary rotation axis that references an orientation of the device as a rotation axis of the device; and calculate a rotation amount according to the reference orientation or the arbitrary coordinate system, or both of them, include a range of the rotation amount to invalidate the rotation amount and determine the rotation amount as a predetermined value or to ignore the rotation amount, and invalidate each rotation amount considering a rotation on other rotation axis when a plurality of rotation amounts are handled.

2. A non-transitory computer-readable medium storing a program that causes a computer to calculate a rotation amount from a reference orientation of a device, wherein the program causes the computer to:

set an arbitrary coordinate system based on an arbitrary rotation axis that references an orientation of the device as a rotation axis of the device; and calculate a rotation amount according to the reference orientation or the coordinate system, or both of them, wherein, in a case where one axis of the device is a Dx axis, which is an axis of a coordinate system that includes a normal of a display of the device as an axis, the coordinate system based on a rotation axis is Cartesian coordinate in which one rotation axis is to match the Dx axis, and another rotation axis is to match an outer product of the Dx axis on the reference orientation and gravity.

\* \* \* \* \*